United States Patent [19]

Yatagai et al.

[11] 3,905,494
[45] Sept. 16, 1975

[54] LOAD SHIFTING TYPE CARGO MOVING DEVICE

[75] Inventors: Shukuro Yatagai; Katunori Tamura, both of Fukuoka, Japan

[73] Assignee: Japanese National Railways, Japan

[22] Filed: Apr. 23, 1973

[21] Appl. No.: 353,672

[30] Foreign Application Priority Data
May 9, 1972 Japan.............................. 47-53277

[52] U.S. Cl.............. 214/89; 198/208; 214/38 CC; 214/620; 214/83.36
[51] Int. Cl.² .................................. B66B 17/00
[58] Field of Search ......... 214/83.14, 83.24, 38 CC, 214/38 C, 83.36, 83.22, 84, 516, 89; 198/203, 208

[56] References Cited
UNITED STATES PATENTS

| | | | |
|---|---|---|---|
| 584,502 | 6/1897 | Gates................................ | 198/208 |
| 1,877,194 | 9/1932 | Nyborg et al........................ | 198/208 |
| 2,507,252 | 5/1950 | Hoover.............................. | 214/83.36 |
| 2,639,025 | 5/1953 | Schmitt.............................. | 198/203 |
| 2,802,583 | 8/1957 | Dansereau.......................... | 214/38 C |
| 2,825,600 | 3/1958 | Macomber.......................... | 214/38 CC |
| 3,025,982 | 3/1962 | Quint................................ | 214/83.36 |
| 3,223,259 | 12/1965 | Nicholson.......................... | 214/38 CC |
| 3,642,154 | 2/1972 | Duszka.............................. | 214/516 |

*Primary Examiner*—Robert G. Sheridan
*Assistant Examiner*—Gary Auton
*Attorney, Agent, or Firm*—Armstrong, Nikaido & Wegner

[57] ABSTRACT

The present invention relates to a load-shifting type cargo moving device for transferring cargo between the cargo-handling site and the element of transport such as a truck or between transport vessels like containers at transshipping points, which makes it possible to finish the job with less manpower more easily in a shorter time than by the conventional method and to carry out the transporting of palletized cargo with great ease.

The present invention consists of a frame which is composed of specified parallel spaces defined by a plurality of parallel projections and of conveyors which are so disposed in every other one of said spaces so as to be able to rotate along said spaces. The arrangement is such that said conveyors can be driven by the same drive shaft to run in the same direction at the same speed. The belt top of each conveyor is located higher than the top of said projection surface. The spaces where there is no conveyor are adapted to structurally receive the tines of forklift; and when said forklift tines are so received in the spaces with no conveyor, the top of the conveyor belt is located below the top of such tines. Transfer of cargo between said conveyor belt and said forklift takes place on a load-shifting principle. Namely, the forklift tines go into the vacant frame spaces and by a vertical displacement of the forklift, the load carried on the tines can be shifted onto the conveyor belt or the other way around. The cargo, the bulk of which has been shifted onto the belt conveyor, is individually transferred to a specified position on a transport element to be fixed there.

In this manner, a load-shifting type cargo moving device of this present invention can be installed on a transport means such as a truck or transport vessel such as a container and when employed in conjunction with a forklift at the cargo handling site, cargo transfer can take place easily in a brief time with use of minimum manpower.

2 Claims, 10 Drawing Figures

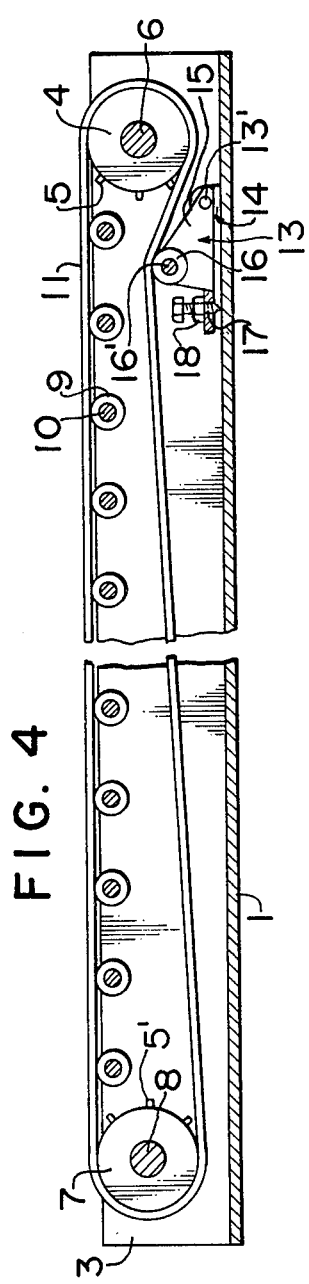
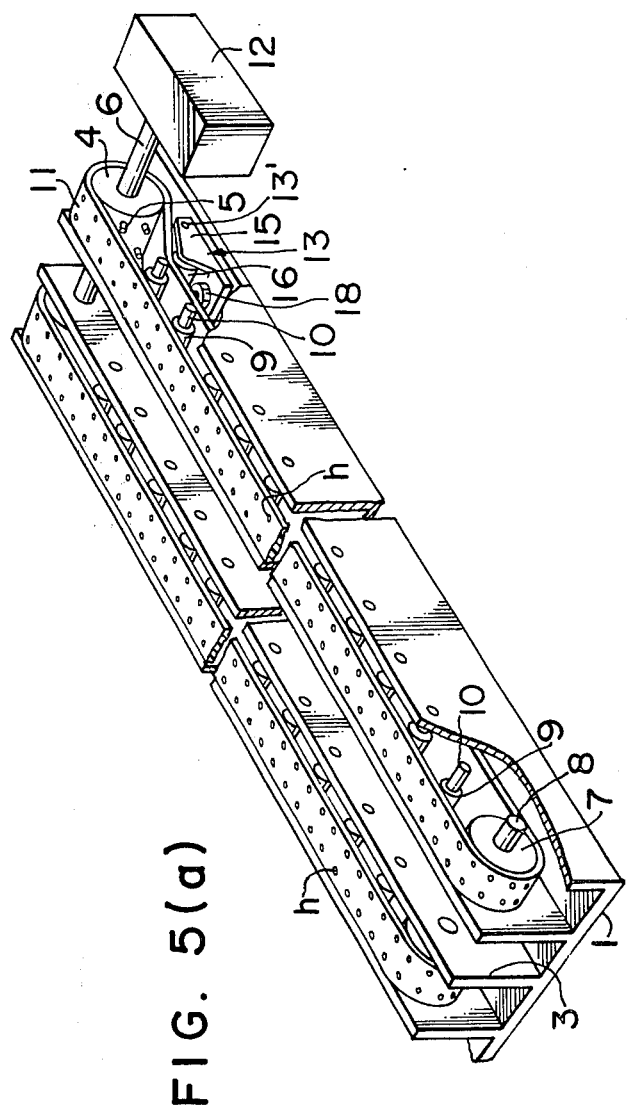
FIG. 4
FIG. 5(a)

LOAD SHIFTING TYPE CARGO MOVING DEVICE

BACKGROUND OF THE INVENTION

The present invention relates to a load-shifting type cargo moving device for transferring cargo between the cargo-handling site and the means for transport such as a truck or between transport vessels such as containers at transship points. Such a device makes it possible to finish the job with less manpower more easily in a shorter time than by the conventional method and to carry out the transport of palletized cargo with great ease.

The present invention comprises a device composed of a frame which constitutes specified parallel spaces defined by a plurality of parallel projections and of conveyors which are so disposed in every other one of said spaces as to be able to rotate along said space. The arrangement is such that said conveyors can be driven by the same drive shaft to run in the same direction at the same speed. The belt top of each conveyor is located higher than the top of said projection surface. The spaces where there is no conveyor, are adapted to structurally receive the tines of a forklift simultaneously and when said forklift tines are received in the spaces with no conveyor, the top of the conveyor belt is located below the top of said tine. Transfer of cargo between said conveyor belt and said forklift takes place on a load-shifting principle. Namely, the forklift tines go into the conveyorless frame spaces and by a vertical displacement of the forklift, the load carried on the tines can be shifted onto the conveyor belt or the other way around. The cargo, the load of which has been shifted onto the belt conveyor, is individually transferred to a specified position on a means of transport, to be fixed there. In this manner, a load-shifting type cargo moving device of this invention can be installed on a means to transport such as a truck or on a transport vessel such as a container, and when employed in conjuction with a forklift at the cargo handling site, cargo transfer can take place easily in a brief time with use of minimum manpower.

The loading space in the greater part of the present trucks constitutes a flat floor. Therefore, for loading or unloading of such a floor space, manpower has mainly been used; and when the cargo to be handled is massive or heavy, waste in manpower and time is great and produces extreme inefficiency. This trend is becoming increasingly notable with an increased size of the means of transport such as trucks in recent years. To avoid such a difficulty, a method of moving the cargo on the floor onto a roller conveyor has been recently introduced, but as long as such a method is used, dependence on manpower for successively shifting the cargo on the floor of a truck for economical transport will be inevitable and also dependence on manpower for stacking the cargo on the truck will be inevitable. In addition, damage to the cardboard package of cargo carried on a roller conveyor cannot be overlooked. Meanwhile, as a method for rationalization of cargo handling through unitization of cargo, a palletization system is popular. Under this system, cargo mounted on a pallet is handled as a unit. However, the pallet must accompany the cargo throughout the shipping process.

Thus, a pallet cannot be diverted to any other use until a unitized cargo reaches it destination and is unpacked or unloaded. Moreover, the space, time and expenses required for storage of empty pallets after unpacking or unloading units for return to the shipping points is so wasteful that individual enterprises are heavily burdened. Individual enterprises are thus compelled to try to standardize the pallets and establish their joint use by pooling them, but this idea has not yet materilized. Under the present circumstances, pallets have to be made available in excess quantities to a great disadvantage from an economic standpoint.

In view of such disadvantages inherent in the conventional practices, the primary object of the present invention is to provide a load-shifting type cargo moving device free from the disadvantages inherent in the conventional practices.

A second object of the present invention is to provide a device for enabling easy loading and unloading of cargo in a short time with much less manpower than by the conventional method, and characterized by such an arrangement composed of a frame equipped with integral parallel projections disposed at specified intervals from one another on the base where the frame is laid out on the floor of the means of transport such as a truck or on the bottom of a transport vessel such as a container. In every other one of the spaces formed between said projections, a belt conveyor to be rotatably driven in the same direction at the same speed is installed. Forklift tines are provided that can be simultaneously inserted into all spaced where there is no said belt conveyor. By a relative vertical displacement of said forklift within said spaces, the load of cargo carried on said forklift is shifted onto a truck or a container or the other way around, thereby to effect cargo transfer; and the displacement of cargo on the floor of a truck can be made by the movement of said conveyor belt.

Still another object of the present invention is to provide a specific effective means which, upon introduction of mechanized cargo handling in a part of the transport process or in the whole transport process, can dispense with storage of empty pallets at destinations or their return to origins, thereby eliminating all waste in space, time and expense. The present device can even dispense with any pallet pooling plan being considered among individual enterprises and can realize a palletless cargo transport of a single system. Thus, a load-shifting type cargo transfer can take place between the load-shifting type cargo moving device of this invention provided on truck or container on one hand and the forks of forklift truck operated between them at transship points.

In this invention, the arrangement is such that there is a frame which is composed parallel spaces defined by a plurality of parallel projections and plurality of conveyors which can run along said spaces, with said conveyors being driven by the same drive shaft to run in the same direction at the same speed. The top belt of said conveyor is located slightly higher than said frame; the vacant spaces are adapted to structurally receive the forklift tines therein simultaneously and when said forklift tines are receied in the conveyorless spaces, the top surface of said tines extends above the top surface of said conveyor belt.

Other objects and features of the present invention will be made clear by the following description together with the accompanying drawings.

SUMMARY OF THE INVENTION

In general, the present invention relates to a load-shifting type cargo moving device constituted such that there are conveyors that can move along a plurality of parallel projections within defined parallel spaces with said conveyors being driven by the same drive shaft in the same direction at the same speed. The top belt of said conveyor is located slightly higher than said frame. The conveyorless spaces are adapted to structurally receive forklift tines therein simultaneously and when said forklift tines are received in the conveyorless spaces, the top surface of said tines extends below the top surface of said conveyor belt. In this cargo moving device, preferably between the drive belt pulley and the driven belt pulley of said belt conveyor, a plurality of free rollers are installed at definite intervals in contact with the underside of said belt, so that said free rollers may bear the load falling on the belt and thereby protect the belt. Said conveyor drive belt pulleys are preferably driven by the same drive shaft and connected to the same power source to rotate in the same direction at the same speed. In addition, a plurality of bosses are formed on the peripheries of said drive belt pulleys and said driven belt pulleys and a plurality of through holes matching said bosses are bored on said conveyor belt. In the process of said conveyor belt being driven by the drive belt pulley, said bosses are preferably made to fit successively into said through holes of said conveyor belt, thereby preventing slippage of the drive belt pulley against the conveyor. In this invention it is desirable to provide a tensioning mechanism for regulating the tightness of said belt by turning an adjust bolt in a specified direction, thereby adjusting the belt tension around the fulcrum to maintain a desirable tightness of the conveyor belt.

The present invention can provide a palletless through transport system using the same method of load-shifting type mechanical handling of cargo in a particular stage of transport. According to this system, at all transshipment points of the transport route, the load-shifting type cargo moving device of this invention is installed in the means of transport such as a truck and in the transport vessel such as a container. The cargo transfer can take place on a load-shifting principle using the fork or forklifts of forklift trucks. This mechanical handling system is also applicable to the whole transport process from origin to destination of shipments.

BRIEF DESCRIPTION OF THE DRAWINGS

FIGS. 1 to 7 illustrate certain embodiments of the present invention.

FIG. 1 is a side view of a load-shifting type cargo moving device according to the present invention.

FIG. 2 is a front elevation view of the same in FIG. 1.

FIG. 3 is a plan view of the same in FIG. 1

FIG. 4 is a partial side section view of the same in FIG. 2.

FIG. 5(a) is a partial cutaway oblique view of the same in FIG. 3.

FIG. 6 is an oblique view of a forklift.

FIG. 7 is an oblique view showing another embodiment of driving mechanism for a belt conveyor.

Referring to FIGS. 1 to 9, the load-shifting type cargo moving device according to the present invention is to be described.

In FIGS. 1 to 7, 1 is a frame of, say, metal, its length and width being taken preferably equal to or slightly less than those of the loading floor of, say, a truck on which said frame is to be mounted. The frame 1 is composed of the base 2 and a plurality of projections 3 are intergrally formed on the top surface of the base 1. The projections 3 are desirably equal in height and as few as possible. These projections 3 are disposed in parallel with certain gaps. In every other one, say, of the spaces formed by adjacent projections 3, a belt conveyor is provided. This belt conveyor consists of a drive belt pulley 4 installed at one end in the longitudinal direction of said space a; a driven belt pulley 7 installed at the other end and an endless belt 11 rotatably placed over the peripheries of said drive belt pulley 4 and said driven belt pulley 7. The top surface of said endless belt 11 is located higher than the top surface of said projection 3. Along the upper edges of opposed projections which constitute the space a the two ends of the shaft 10 for a plurality of free rollers 9 are rotably set and separated by a predetermined distance. The peripheries of free roller 9 are held in contact with the high part in FIG. 4 of said endless belt 11 and fitted to the upper edges of the corresponding projections such that said rollers can rotate through the roller shaft 10 together with the running of the endless belt 11. Also, the driven belt pulley 7, just as said free rollers 9 is rotatably fitted via the shaft 8 between the appropriate projections. It is for the purpose of avoiding the forks being hindered in going into the space b that the shafts 8 and 10 are separately attached in the space a. The endless belt 11 may be a conventional one, i.e., a press-molded product of, say, cloth or rubber; it has only to be tensil, flexible and durable enough as a conveyor belt. A metal chain or link may substitute for the conveyor belt 11. A conveyor belt of such composition as above is however, preferable in that it is less heavy than chains or links in general, and by that much the weight of the whole device is reduced. The damage it can inflict to the load in the transport process is relatively small but it prevents slippage of the load and it produces little noise in operation. In the longitudinal direction of the conveyor belt 11, equi-spaced through holes h are bored and bosses 5 and 5' that can fit into said through holes h are formed on the corresponding peripheries of the drive belt pulley 4. The driven belt pulley 7 is so arranged that, in the running process of said belt 11, said through holes h may engage the matching bosses 5 and 5' on the drive belt pulley 4 and the driven belt pulley 7. This configuration avoids slippage between said belt 11 and said drive belt pulley 4. In FIG. 4, the belt-tensioning mechanism 13 is installed in contact with the underside of the lower part of the conveyor belt. This belt-tensioning mechanism 13 can be constructed as illustrated in FIG. 5(b). In FIG. 5(b), brackets 14, 14' are provided with a specified interval at predetermined positions on the base corresponding to the opposite portions of the underside of the belt 11 and to said brackets 14, 14'. The two ends of the arm shaft 13' are free-rotatably attached to brackets 14, 14'. To the part of said arm shaft 13' which projects beyond said brackets 14, 14' are respectively fitted one end 15a of support arms 15, 15'. The top surfaces of said support arms 15, 15' are formed such that toward the right extreme in FIG. 5(b), they rise upward with a certain angle of inclination and then suddenly they are inclined downward. The down-inclined parts are respectively connected in a nearly horizontal fashion to the extreme left part 15b in FIG. 5(b). To the upward rising part of said support arms 15, 15' are fixed the two ends of the shaft 16' of tensioning wheel 16 with the tensioning wheel 16 being free to rotate in relation to said shaft 16'. At the specified position on the left end 15b of the support arm is screwed a bolt 17, the tip of which is in contact with a specified part of the top of the base 1.

Under this arrangement, the support arms 15, 15' are rotatable in an arc with the arm shaft 13' as the center in the arrow direction. Therefore, by arranging the structure such that the underside of the belt 11 may contact the periphery of the tensioning wheel 16, it is possible to turn the support arms 15, 15' in the arrow direction of arc around the arm shaft 13' when said bolt 17 is turned in a predetermined direction; and it is thereby possible to regulate the degree of tension in the belt 11. In FIG. 5(b), 18 is a lock-nut for preventing the bolt 17 from getting loose.

Figure 1:
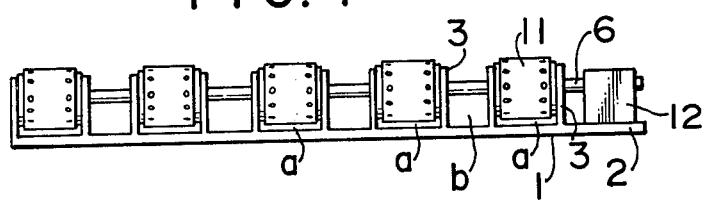
Figure 3:
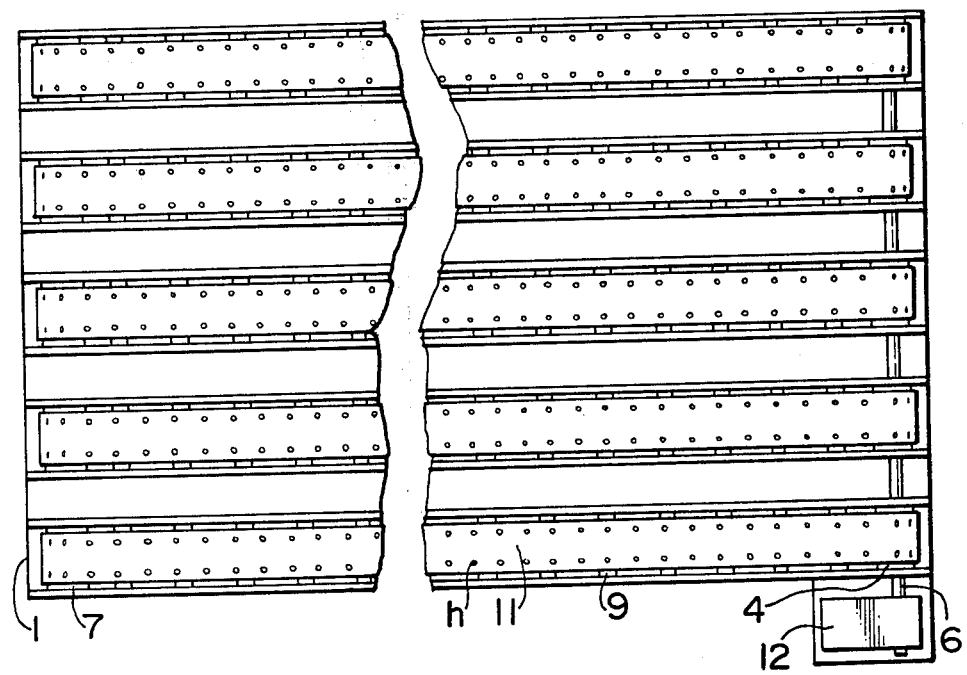
Figure 2:
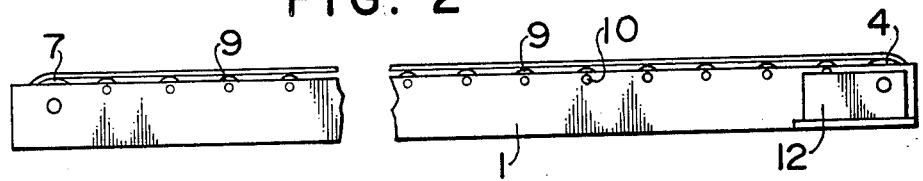
Figure 5B:
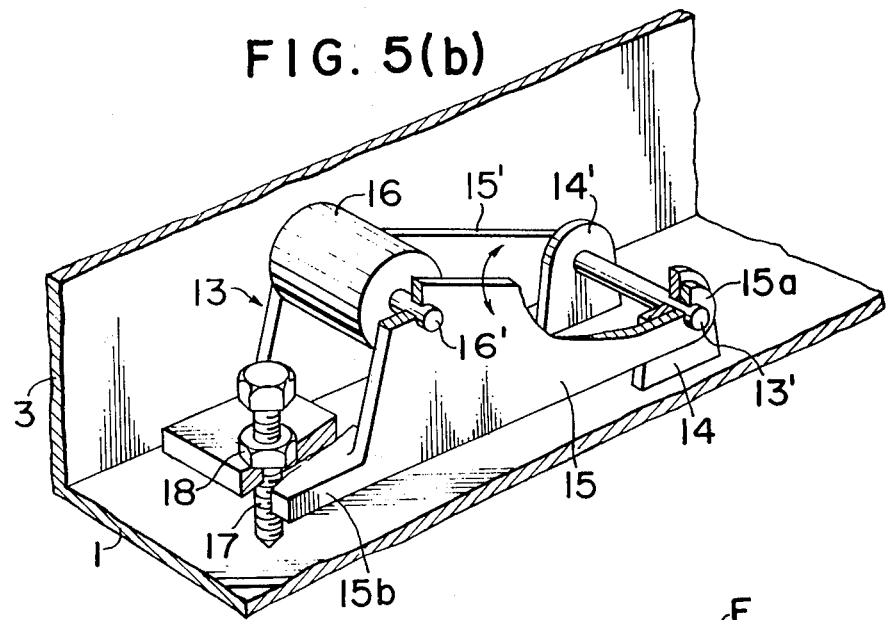
FIG. 5(b) is an enlarged oblique view of the belt tensioning mechanism in FIG. 5(a).

Belt conveyors thus constructed are disposed parallel to one another in alternate spaces constituted between the projections 3 of the frame 1. Thereby, the drive belt pulley 4 of each conveyor belt is connected to one drive shaft 6 and it is driven in the same direction at the same speed by the power source 12 of said drive shaft 6. It is desirable to install the drive shaft 6 at the tip of the frame, if possible, so that said shaft 6 may not prevent the fork from going into the space b.

Figure 8:
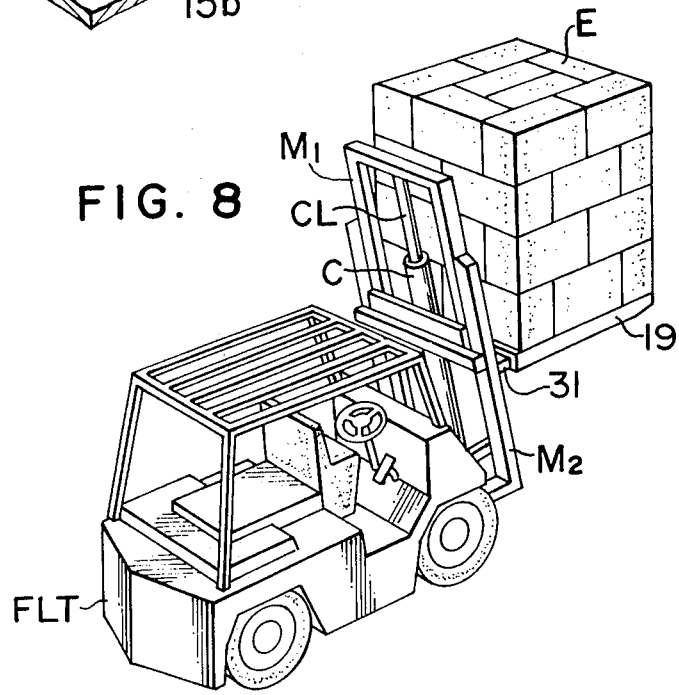
FIG. 8 is an oblique view showing a forklift of FIG. 6 as attached to a conventional forklift truck.
Figure 7:
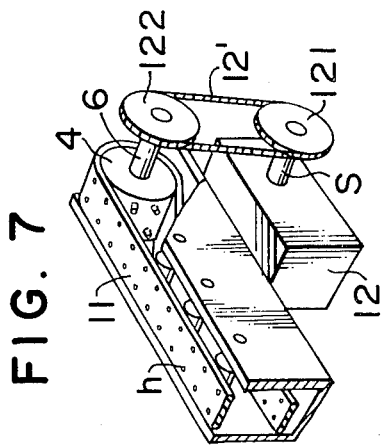

In FIGS. 1 to 5(a), the construction is such that the drive source 12 is directly connected to the shaft 6, but is may be such that, as illustrated in FIGS. 7 and 8, the power of the drive source 12 is transmitted via shaft S, sprocket 121, 122 and chain 12' of prior art to the shaft 6. Those of the spaces in the frame 1 which hold no conveyor are adapted to permit simultaneous entry of forklift tines and receipt thereof.

Figure 6:
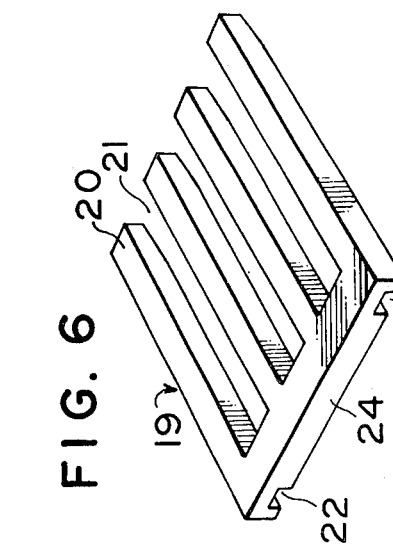

FIG. 6 illustrates a forklift 19 to be employed in this case. A forklift if fabricated of metal or a similar material and a plurality of tines 20 are fomed as integral portions of the base 24 in the form of comb teeth. At the bottom of said forklift, for instance at both ends, fitting slots 22, 23, that can receive the forks of a conventional forklift truck are provided running along the tines 20.

Forklift 19 can go onto, say, the forks of a conventional forklift truck by means of said fitting slots and can be operated through manipulation from said forklift truck. Referring to FIG. 8, the construction and operation are to be briefly described.

In FIG. 8, $M_2$ are the outside masts of a conventional forklift truck, and $M_1$, are its inside masts. The outside masts $M_2$ are located in the vertical direction on the base plate extending at a predetermined distance from the underside of the forklift truck FLT and located between two wheels in the travel direction of the forklift truck. Along the inside of said outside masts $M_2$ there are installed said inside masts $M_1$. These inside masts $M_1$ are guided along the inside of said outside masts $M_2$, and are movable in the vertical direction. In the upper part between said inside masts $M_1$ there is installed a lift bracket by means of a fastener. At the mid-point of the base plate between said outside masts $M_2$, there is installed a hydraulic mechanism C like a cylinder. The tip of the rod CL in said cylinder C is fixed to the mid-point of the upper connection frame of said inside masts $M_1$. When said cylinder rod CL is driven from said forklift truck, said rod CL moves in the vertical direction and said inside masts $M_1$ move along said outside masts $M_2$. Thereby, the lift bracket located above the inside masts $M_1$ and the fork 31 attached to said bracket are displaced in the vertical direction.

The number of fitting slots 22–23 in the forklift 19 illustrated in FIG. 6 is variable depending on the number of forks in the forklift truck. If necessary, said forks may be fastened with clamps that can be fitted to said fitting slots 22–23. The number of forklift tines 20 is equal to or less than that of the spaces b in the frame 1 of FIG. 1 and the width of the tine 20 is slightly smaller than that of the space. Meanwhile, the gap 21 between tines is slightly greater than the width of the space a in the frame 1 and the height of said tine 20 is smaller than the height of the top surface of the conveyor belt 11 from the top level of the base 1. Accordingly, the tines 20 of the forklift 19 illustrated in FIG. 6 can go at the same time into the numerous spaces b in FIG. 1. When the underside of said tine 20 comes nearest to said base 1, the top side of said tine 20 is located below the top side of the conveyor belt 11. It is possible to adapt a fork of the forklift truck with such dimensions as described above, instead of using a forklift 19 as illustrated in FIG. 6.

Figure 9:
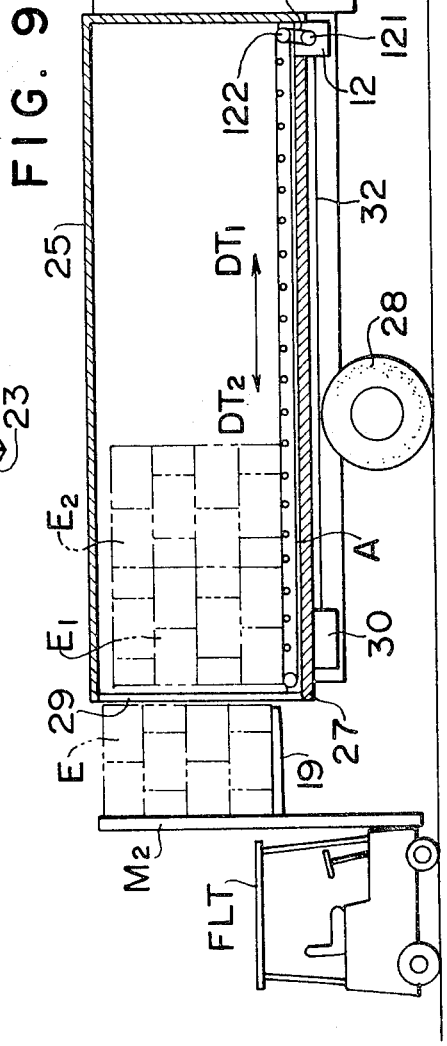
FIG. 9 is an elevation view illustrating cargo being loaded or unloaded from a truck using the device of the present invention.

FIG. 9 illustrates an embodiment of a load-shifting type cargo moving device of this invention wherein the device is mounted on the loading floor 27 of a truck 26 and coupled with a forklift engaging the fork of a forklift truck for cargo transfer. In this case, the truck 26 is a conventional one but it is preferable that the end gate 29 be a conventional one that can fully swing open to both sides. The cargo moving device A is fixed immovable on the loading floor 27.

As illustrated in forklift 19 8, the forklift shown in FIG. 6 is inserted in the fork of the forklift truck FLT; a cargo unit $E_2$ is loaded (or transferred) onto said forklift; the forklift truck is moved up the truck 26 and positioned adjacent to one end of said load-shifting type cargo moving device placed on the loading floor 27 of said truck 26; as described above referring to FIG. 8, by driving the cylinder c from the forklift truck, the fork 31 is raised to the extent that the top-side of the forklift tine 20 inserted into said fork reaches a horizontal plane higher than the top side of the conveyor belt mechanism laid out on the loading floor 27 of said truck 26; in this condition, the forklift tine 20 is shifted parallel to the space b in the travel direction of said truck 26 in FIG. 9; and then said forklift tine 20 is halted at the point where the rear end of said cargo unit nearly bears against the rear top of said cargo moving device. Thereupon, by displacing said fork 31 downward, the load of said cargo unit on said forklift tine 20 can be shifted onto the conveyor belt 11. Thereafter the forklift tine 20 is displaced further downward and the fork 31 is withdrawn in the right direction in FIG. 9 thereby taking the forklift tine 20 out of said space. Next, by closing, for instance, a switch provided in a casing 30 under the loading floor 27, power is supplied via lead 32 to the drive source 12; the drive shaft 6 thus driven via the sprockets 121, 122 and chain 12' rotates in a predetermined direction, thereby causing the belt conveyor to run in the direction of $Dt_1$.

Thus, said cargo unit is carried and stopped at $E_2$. Then, more cargo units E, $E_1$ carried on other forklift trucks are moved up to said truck in the same way and successively shifted onto said truck by means of said cargo moving device.

When a cargo unit on the cargo moving device of the truck 26 is to be shifted onto the forklift 19 of the forklift truck FLT, the above process is just reversed. Namely, the forklift tines 20 are simultaneously thrust into the space $h$; the forklift 19 is displaced upward; said cargo unit on the conveyor belt is shifted onto said forklift; and said cargo unit on said forklift is carried to its destination by the forklift truck. Then power is supplied to the drive source 12 to drive the conveyor belt in the direction of $Dt_2$; a cargo unit situated at, say, $E_2$ is moved up to $E_1$; and similarly to the above, said cargo unit is carried to its destination by the forklift. Incidentally, in FIG. 9, $2h$ is a roof of loading floor 27, and 28 are tires of the truck 25.

If the load-shifting type cargo moving device is provided on the transport vehicle such as a truck or a wagon; on the transport vessel such as a container; and at the cargo handling point such as a transship point, the combination of such device with the forklift attached to the fork of a forklift truck operated between them, will offer an effective means of a consistent transport over a particular part of a transport route or over the whole route from origin to destination using the same mechanical handling system of the load-shifting type.

The merits attributable to the present invention are as follows:

1. Unlike the conventional case of cargo handling with a vehicle having a flat loading floor, the cargo can be loaded or unloaded with hardly any manpower needed, and with ease in a short time.

2. Unlike the case of the loading floor being equipped with a roller conveyor, cargo transfer can be carried out swiftly with very little manpower needed. Moreover, when the cargo is shifted on the floor, damage to its cardboard package can be minimized.

3. Further, as mentioned above, when the mechanical handling involving the use of the device according to the present invention is applied to a specified section of transport route or if necessary, to the whole route from origin to destination, most of the inconveniences attended on the present palletized system will be eliminated; wastes in time, space and expense necessitated for storage or return of empty pallets; and the necessity of holding more pallets than are actually required.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A load-shifting type cargo moving device for use in conjunction with a forklift, comprising a frame with a base on which are formed specified parallel spaces defined by a plurality of parallel projections with a plurality of conveyor means which are installed longitudinally in every other one of said spaces and is adapted for movement therein, said conveyor means being driven and operating in the same direction at the same speed by a common drive shaft with a belt on said conveyor means located at a position higher than the upper extremity of said frame, wherein the said spaces which are free of said conveyor means are for simultaneous introduction of forklift tines such that when said tines are so introduced into the said spaces, the top side of said belt is located above the upper extremity of said tines and wherein a plurality of free rollers are arranged at definite intervals in such manner that said rollers bear against the underside of the upper part of the belt stretched between a drive belt pulley and a driven belt pulley of the conveyor means and a plurality of bosses are formed on the peripheries of the drive belt pulley and the driven belt pulley of the conveyor means, a plurality of through holes matching said bosses are bored on the belt, and in the process of the conveyor means being driven by the drive belt pulley, said bosses successively enter and exit said through holes and, wherein a belt-tightness adjuster means is provided which contacts the underside of the lower part of the belt and is comprised of a tensioning wheel rotatably mounted on support arms resting on the base.

2. A load-shifting type cargo moving device according to claim 1, wherein the support arms of the belt tightness adjustor means are inclined with the wheel located at the upper extremity thereof and wherein a shaft is located near the lower extremity thereof such that said shaft extends through the arms which are rotatable thereabout and having an adjusting means located at the opposite end of the arms thereby permitting rotation of the belt-tightness adjusting means in an arc.

* * * * *